Patented Mar. 4, 1952

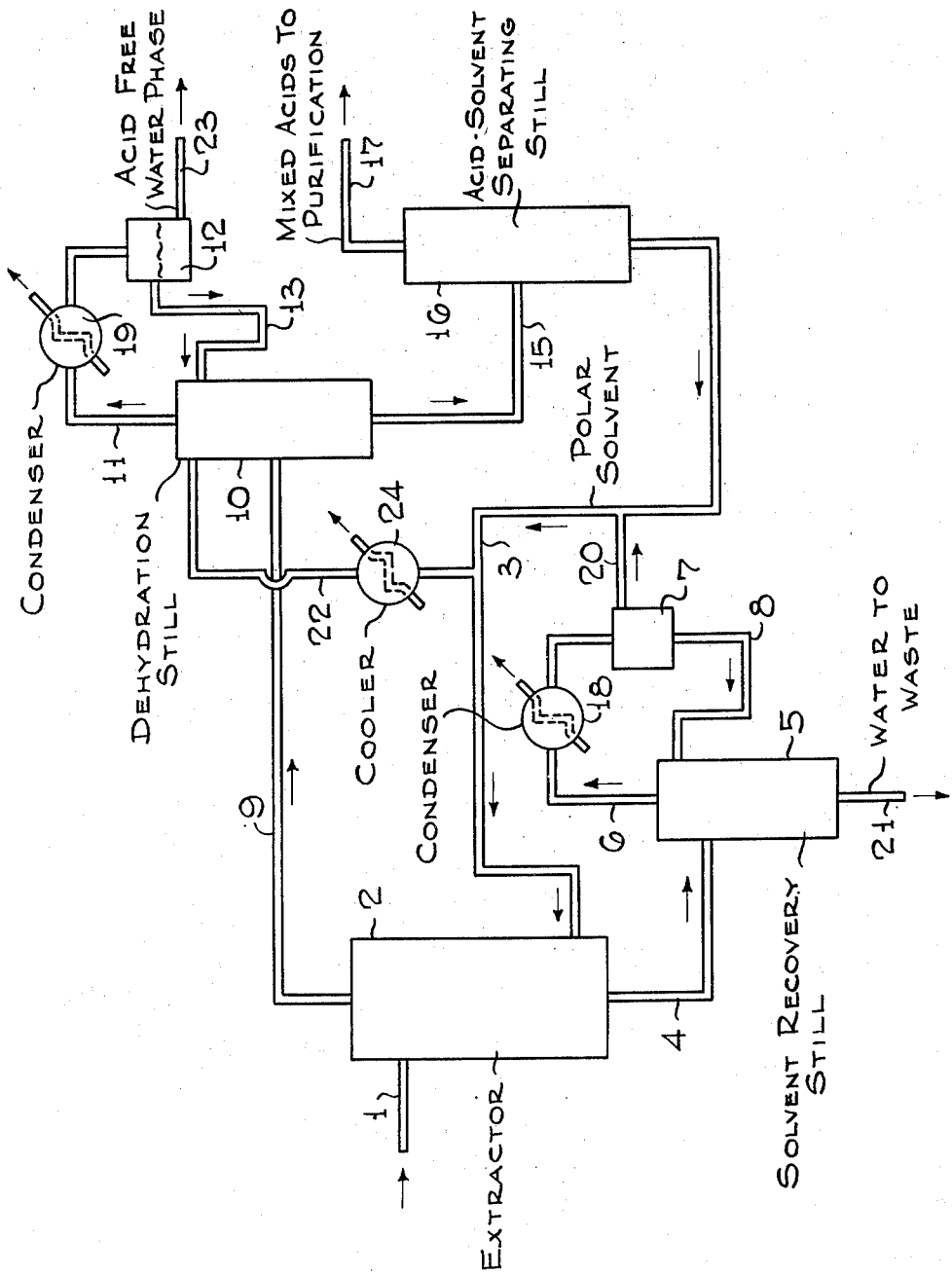

2,588,268

UNITED STATES PATENT OFFICE 2,588,268

PROCESS FOR DEHYDRATING ISOPHORONE FATTY ACID EXTRACT

Kenneth K. Mercer, Houston, Tex., and William E. Catterall, Elizabeth, N. J., assignors to Standard Oil Development Company, a corporation of Delaware Application September 22, 1948, Serial No. 50,646

1 Claim. (Cl. 202—42)

This invention relates to an improved process for extracting and dehydrating fatty acids as present in low concentrations in aqueous solutions. More particularly, it relates to an efficient commercially feasible process for the extraction and purification of a mixture of fatty acids as found in low concentrations in the aqueous layer resulting from hydrocarbon synthesis reactions.

Hydrocarbon synthesis reactions are performed by contacting hydrogen and oxides of carbon with catalysts under various temperature and pressure conditions. The temperatures employed vary widely, as for example, in the range from about 200° C. to about 425° C. and are generally in the range from 260° C. to about 370° C. The particular temperature employed depends upon, among other factors, the type of non-gaseous hydrocarbon product desired, the character and the activity of the particular catalyst utilized, the throughput and composition of the synthetic gases and upon the reaction pressure. The pressures, likewise, vary considerably and are a function of other operative conditions such as catalyst employed, activity, of the catalyst, character of the feed gases and the temperatures utilized. Operations such as described are generally conducted under conditions to secure the maximum yield of hydrocarbon constituents containing 4 or more carbon atoms in the molecule. However, under the conditions of the operation, various side reactions occur which result in the production of valuable oxygenated compounds.

The proportion of the type products obtained also varies with the conditions. In all cases, however, gaseous products removed overhead from the reaction zone are condensed and segregated into an oil phase and an aqueous phase.

The oxygenated compounds produced during hydrocarbon synthesis are distributed between the oil and water phases in an amount which is a function of the relative volume of product oil and water and the molecular weight and type of the oxygenated compounds produced. The latter factor is involved in the distribution of the oxygenated compounds in the two phases. In normal operations, the ratio of water produced to oil produced may vary over the range from about 0.3 to 3.0 volumes of water per volume of oil, depending upon the operating conditions and the catalyst employed during the synthesis. Accordingly, there is a wide variation in the proportion of the total oxygenated compounds existing in the water phase; and this extends over the approximate range from 10 to 40 weight percent.

The oxygenated compounds found in the water layer comprise the neutral compounds including alcohols, aldehydes, ketones and esters, and fatty acids.

The neutral oxygenated compounds are recovered from the water layer by distillation carried out below 100° C. The neutral compounds and their water azeotropes are thus stripped off first, leaving substantially only the fatty acids in the water. The stripped aqueous layer or acid water bottoms from most synthesis runs contains the $C_2$—$C_6$ aliphatic acids in a total concentration equivalent to about 2 to 5 weight percent as acetic acid, often nearer the lower figure. It is desirable to recover these acids in marketable purities and substantially quantitatively free from the water, since their disposal as waste is not practical due to the pollution problems and any chemical disposal involves added expense in the hydrocarbon synthesis process. In addition, these organic acids represent valuable chemical raw materials for industry.

Economic recovery of acids in such low concentrations is quite difficult to achieve by conventional distillation methods because of the prohibitive heat requirements and equipment sizes necessitated by the very dilute feeds. This applies of course to any very dilute aqueous solution of lower fatty acids as well as the dilute solution obtained from hydrocarbon synthesis reactions discussed.

Recent studies have shown that a solvent extraction process, utilizing high-boiling selective polar organic solvents such as isophorone, may be applied advantageously to the recovery of the lower fatty acids from very dilute aqueous solutions. In such a process, these acids are extracted from water solutions by the solvent in a countercurrent operation, utilizing conventional extractors such as packed towers and perforated plate columns. Countercurrent treatment of the dilute aqueous feed with solvent, usually performed at atmospheric temperature, results in an extract containing the bulk of the fatty acids originally present in the aqueous feed, together with some of the water as dictated by equilibrium solubility relationships. Since the desired final product is substantially anhydrous acids, it is necessary conventionally to carry out two distillation operations on this extract, the first having the purpose of separating water from the extract and the second, separating the anhydrous mixture of acids from the bulk of the solvent.

In any case, conventionally following the extraction step, a dehydration distillation is performed on the extract in which it is desired to remove substantially all the acid-free water overhead with perhaps only a small amount of polar organic solvent and to leave the polar organic solvent and acids as bottoms. This results, however, in a substantial quantity of the $C_2$—$C_4$ acids being taken overhead with the water and some solvent. These combined overhead vapors from the distillation column separate into two phases on condensation. The isophorone phase is returned to the top of the tower and the water layer, if containing acid has to be recycled to the liquid-liquid extractor. The isophorone layer could be used as reflux in an enriching section of the column, but the quantity of isophorone (which corresponds roughly to the azeotropic quantity based on the amount of water) is so small that little enrichment is obtained. In other words, the amount of acid in the overhead is not greatly reduced by the use of this small amount of solvent reflux, and the economy of adding enriching plates to the tower is doubtful. The consequent necessary weak acid recycle to the extractor increases the duty in the extractor and also increases the rate of solvent circulation to the extractor, which is an important disadvantage because of increased equipment sizes necessitated.

It has now been found that the polar organic solvent extract can be efficiently dehydrated by fractional distillation in the presence of additional solvent reflux so that substantially acid-free water is taken off overhead, thus eliminating the necessity of the uneconomical weak acid recycle.

It is to be understood that whenever the term, "high boiling polar organic solvent," is used hereafter that it connotes normally liquid organic compounds having, at most, limited solubility in water, good extractive capacities for acetic propionic and butyric acids, and having boiling points substantially above the boiling points of the $C_4$ fatty acids, e. g., 160° C., or higher. Among such polar solvents are: methyl cyclohexanone, B. P. 165° C.; furfural, B. P. 162° C., isophorone, B. P. 215° C., the cresols, and $C_5$—$C_{12}$ carboxylic acids.

The general term, mixture of lower fatty acids, is hereafter used to indicate a mixture of predominantly up to and including the $C_4$ aliphatic acids.

It is to be understood, of course, that, while the process of this invention is applicable to the dehydration of a mixture of fatty acids, it is also applicable where there is only one of these acids present in the aqueous solution. In the descriptions that follow of the concentration of the acids the term "mixture of fatty acids" can therefore usually be replaced by one of the specific acids, i. e., acetic acid.

This invention will be further explained by reference to the accompanying flow diagram, Fig. 1.

The aqueous feed containing the mixture of fatty acids is fed through line 1 to the upper portion of extractor 2. The preferred polar organic solvent used as the extractant is isophorone. The polar organic solvent enters the lower portion of extractor 2 through line 3. The extractant or spent water layer passes to a solvent recovery still 5 through line 4. The isophorone-water azeotrope (B. P. 94° C. at one atmosphere, 12.6% isophorone) is then taken overhead through line 6 and condenser 18 to decanter 7 where it separates into two layers. The water layer is returned through line 8 to the solvent recovery still and isophorone layer is sent to the recycled isophorone stream through line 20.

The extract containing polar organic solvent, acids, and some water leaves the extractor 2 through line 9 to dehydration still 10. Polar organic solvent and water are taken overhead in a ratio approaching the azeotropic ratio through line 11 and condenser 19 to decanter 12. The solvent layer is returned as reflux through line 13. The acid-free water product leaves through line 23 and is sent to solvent recovery still 5 to recover residual amounts of solvent. The substantially water-free, acid and solvent mixture leaves still 13 as bottoms through line 15 to acid solvent separating still 16. The acids are taken off overhead through line 17 and purified by fractionation elsewhere. The isophorone is discharged as bottoms through line 3. Part of the isophorone is sent through line 22 and cooler 24 to the upper portion of dehydration still 10 as additional reflux. The remaining solvent in line 3 is recycled to the extractor 2. Make-up solvent is added as needed.

The operating temperatures of the process are dependent upon a large number of engineering details such as the temperature of the feed, the utilization of heat exchangers and the pressures developed at various stages. In the main the temperatures and the pressures for this process may lie within the limit of 25–250° C. for temperature and 50 mm. absolute to 30 p. s. i. g. for pressure.

The recycling of polar organic solvent as additional reflux shown in line 22 is highly significant for accomplishing complete separation of the $C_2$—$C_4$ acids from water in the zone of the tower above the extract feed point and yields substantially acid-free water overhead.

When $C_5$—$C_{12}$ acids are used as the polar organic solvents the additional solvent supplied at reflux cannot of course be "acid-free." The term "acid-free" as used herein, both in respect to the water taken overhead from the dehydration tower and the additional solvent used as reflux, connotes free of the acids it is desired to obtain as products, i. e., $C_2$—$C_4$.

The utilization of the additional acid-free solvent as reflux can be understood by recognizing that its main function in the fractional distillation zone of the stripping column above the extract feed point is to remove acids from the vapors (predominantly water vapor) ascending the column in this zone. An acid-containing solvent reflux, as well as an aqueous reflux is substantially ineffective for this purpose because of the very low relative volatility between water and acids at high water concentrations. On the other hand, an acid-free solvent reflux is very effective because it selectively extracts acids from the vapor in a manner very similar to the action of liquid solvent in extracting acid from liquid water. However, when operating the tower in the conventional manner without additional solvent reflux, the quantity of solvent reflux available is usually so small that the degree of removal of acids from the ascending vapors is very limited. When this small quantity of solvent reflux is supplemented with extraneous solvent reflux, any desired degree of acid removal can be effected.

When the tower is operated in the conventional manner, the ratio of the quantity of solvent descending the tower in the reflux liquid at any point above the extract feed to the quantity of solvent ascending the tower in the vapors at the same point must be essentially unity (actually slightly less than unity since a small amount of solvent is withdrawn from the top of the tower in the decanted water layer). This ratio can be termed the solvent reflux ratio. When additional solvent reflux is provided as per the method of this invention, the solvent reflux ratio is increased to any desired value above unity. In general, the quantity of additional acid-free solvent reflux to be used is at least equal to the quantity of solvent distilled and the optimum quantity will vary with factors such as the particular kinds of acids, their concentrations, column plates, etc. The desired additional amount of acid-free polar organic solvent may be obtained from the bottoms of the acid-solvent separating still or from any other available source.

It can be readily seen that the method of this invention for dehydrating aqueous fatty acid solutions can be applied to the dehydration of fatty acid extracts regardless of the prior treatment that the extract has received such as, for example, preliminary water removal steps. The method of this invention can also be used when an acid-water feed containing a higher concentration of acids is available, i. e., at least 15% by weight. The separate extraction step can be entirely dispensed with and the dehydration distillation conducted as indicated above when these more concentrated feeds are available. Thus the feed would initially have no extractant present.

Where a neutral polar organic solvent is used as the extractant, the build-up of $C_5$ and higher acids in the solvent may be undesirable. These $C_5$ and higher acids can be removed from the solvent by an alkali wash, followed by steam distillation to take the neutral polar organic solvent overhead. The neutral polar organic solvent can then be recycled for use in the continuous system.

As will be apparent from the foregoing, the present invention may be practiced with any of the above types of extractant solvents and with procedures other than those specifically described and under varied conditions of temperatures, pressures, or concentrations of materials but with controls indicated. Such modifications are part of this invention and are intended to be included therein.

What is claimed is:

A process for dehydrating a mixture of $C_2$ to $C_4$ fatty acids contained in an aqueous high-boiling isophorone extract solution of said acids along with higher fatty acids, which comprises dehydrating the extract in a fractional distillation zone; cooling and condensing the overhead vapors from said distillation zone to obtain a two-layer condensate of the isophorone solvent and of water; decanting from the resultant condensate the solvent layer; discarding the water layer; returning the solvent layer to the distillation zone as external reflux; discharging a substantially anhydrous acid-isophorone mixture from the distillation zone; distilling off $C_2$ to $C_4$ acids from the acid-isophorone mixture, leaving a $C_2$ to $C_4$ acid-free solvent bottoms; alkali washing said isophorone bottoms to remove residual higher fatty acids therefrom; and supplying the thus treated isophorone bottoms free of acid in an amount at least equal to the amount of external reflux to the upper portion of the distillation zone to prevent the acids from distilling overhead with the isophorone and water.

KENNETH K. MERCER.
WILLIAM E. CATTERALL.

REFERENCES CITED

The following references are of record in the file of this patent:

UNITED STATES PATENTS

| Number | Name | Date |
|---|---|---|
| 2,275,862 | Othmer | Mar. 10, 1942 |
| 2,123,348 | Wentworth | July 12, 1948 |
| 2,526,508 | Scheeline et al. | Oct. 17, 1950 |